(12) United States Patent
Kim

(10) Patent No.: US 9,209,864 B2
(45) Date of Patent: Dec. 8, 2015

(54) CLOSED-CIRCUIT POWER LINE COMMUNICATION SYSTEM FOR LARGE CAPACITY LOAD

(71) Applicant: Jung-Ho Kim, Seoul (KR)

(72) Inventor: Jung-Ho Kim, Seoul (KR)

(73) Assignee: UNILUX INC., Seongnam-Si (KR), part interest (*) Notice: Subject to any disclaimer, the term of this patent is extended or adjusted under 35 U.S.C. 154(b) by 0 days.

(21) Appl. No.: 14/358,029

(22) PCT Filed: Feb. 8, 2013

(86) PCT No.: PCT/KR2013/001038
§ 371 (c)(1),
(2) Date: May 13, 2014

(87) PCT Pub. No.: WO2013/187573
PCT Pub. Date: Dec. 19, 2013

(65) Prior Publication Data
US 2015/0043660 A1    Feb. 12, 2015

(30) Foreign Application Priority Data

Jun. 14, 2012   (KR) .................. 10-2012-0063820

(51) Int. Cl.
*H04B 3/56* (2006.01)
*H04B 3/54* (2006.01)
*H04B 3/58* (2006.01)

(52) U.S. Cl.
CPC .................. *H04B 3/56* (2013.01); *H04B 3/542* (2013.01); *H04B 3/58* (2013.01); *H04B 2203/542* (2013.01)

(58) Field of Classification Search
CPC ....... H04B 3/54; H04B 3/542; H04L 27/2649
USPC .......................................................... 375/257
See application file for complete search history.

(56) References Cited

U.S. PATENT DOCUMENTS

| 5,929,749 | A | * | 7/1999 | Slonim et al. ............ 340/870.01 |
| 6,734,784 | B1 | * | 5/2004 | Lester ......................... 340/12.33 |
| 2010/0283391 | A1 | * | 11/2010 | Braunshtein .................. 315/127 |
| 2012/0032608 | A1 | * | 2/2012 | Nerone ......................... 315/291 |

* cited by examiner

*Primary Examiner* — Shuwang Liu
*Assistant Examiner* — David S Huang
(74) *Attorney, Agent, or Firm* — Robert W. J. Usher

(57) ABSTRACT

The present invention relates to a power line communication system for a large capacity load which greatly improves the recognition ratio and accuracy of a communication signal even for a large capacity load in that it: includes a switch unit as a transmission means wherein a first switch made of semiconductor elements and a second switch made of relay elements are connected in parallel; and generates and transmits a communication signal by selectively using the switches.

8 Claims, 4 Drawing Sheets

CLOSED-CIRCUIT POWER LINE COMMUNICATION SYSTEM FOR LARGE CAPACITY LOAD

TECHNICAL FIELD

The present invention relates to a closed-circuit power line communication system, and more specifically, to a closed-circuit power line communication system for a large capacity load, which improves greatly a recognition rate and an accuracy of a communication signal even for the large capacity load by configuring a switch unit in a transmission means by connecting a first switch manufactured using a semiconductor switching device and a second switch manufactured using a relay switching device in parallel and generating and transmitting a communication signal by selectively using the switches.

BACKGROUND ART

Generally, in most cases, power line communication uses a method of modulating a signal (a communication signal) desired to communicate and overlapping the modulated signal on a power line to which a corresponding device is connected.

However, a communication signal modulated by the power line communication method acts as a noise in a general device which is connected to the same power system and does not desire communication.

In addition, when a certain device connected to the power system generates a lot of noises, a communication error occurs, and thus the communication speed is lowered. In addition, the modulated signal generally has a high frequency, and if a peripheral device having a condenser at an input unit exists in the power system, impedance is lowered greatly for a corresponding modulated signal, and this will almost short-circuits the device, and the signal cannot be transferred to a far distance.

Accordingly, a prior art related to the power line communication has been proposed by the inventor of the present invention to solve the problem.

The power line communication method is a communication method of a new type completely different from an existing power line communication, and this is particularly a technique appropriate to an illumination control field or the like having a small amount of data to be transferred without the need of high transmission speed.

This will be described with reference to companying drawings.

As shown in FIG. 1, a conventional closed-circuit power line communication system includes a transmission means 10 connected to one side of the power line P in series to generate a communication signal and transmit the communication signal through the power line and a plurality of reception and load means 20 connected to both sides of the power line P in parallel to receive the communication signal transmitted through the power line and control a corresponding load.

The transmission means 10 includes at least a control signal generation unit 12 for generating a control signal for generating a power line communication signal, and a switching device 13 connected to one side of the power line in series to perform a switching operation by the control signal generation unit 12.

This will be described in detail.

The control signal generation unit 12 outputs a predetermined switching signal to the switching device 13.

That is, in synchronization with the waveform of a (AC) power flowing through the switching device 13 as shown in FIG. 2(a), the control signal generation unit 12 outputs a switching signal for turning off the switching device 13 for a short time period right after the zero cross of the power waveform as shown in FIG. 2(b).

The switching signal of a form as shown in FIG. 2(b) has a meaning of a communication signal (data), which will be described below.

Accordingly, it is understood that output is blocked for a short time period $t_A$ right after the zero cross as shown in FIG. 2(c) in the case of a power waveform output through the switching device 13.

Here, it is assumed that if the power waveform is in an OFF state for a predetermined time period $t_A$ before a next half cycle starts right after a zero cross, this is defined as '1', and if the power waveform is immediately turned to ON at the moment of starting the next half cycle right after the zero cross, this is defined as '0'.

Accordingly, FIG. 2(b) shows a switching signal having information '1011', and due to this switching signal, a power waveform transformed as shown in FIG. 2(c) based on the switching signal is simultaneously applied to the plurality of reception and load means 20 through the power line.

Here, the communication information '1011' is an example and can be transformed diversely, and contents of the communication information include information on an ID of a corresponding illumination lamp, as well as control information for turning on and off and dimming the illumination lamp, which is a corresponding load.

In addition, although the transformed power waveform including the communication information has a period where power is turned off for a time period $t_A$ as shown in FIG. 2(c), this time period $t_A$ is extremely short and does not fail to supply a rated power as a whole.

A key input unit 11 of the transmission means 10 is a switch circuit for inputting a key signal to generate and transfer a control signal, i.e., a switching signal, having information '1011' to the control signal generation unit 12.

Meanwhile, the reception and load means 20 is a plurality of load units connected to the closed-circuit power line P in parallel and includes a power supply unit 21, a load control unit 22, an illumination lamp 23, a signal detection unit 24 and a signal processing unit 25.

The power supply unit 21 receives (AC) power input from the power line P and supplies a driving power to the illumination lamp 23 and a DC driving power to each circuit unit.

The load control unit 22 receives and analyzes the communication signal received from the signal processing unit 25 and controls turning on and off or dimming a corresponding illumination lamp 23 according to the analysis.

The signal detection unit 24 detects the communication signal input through the power line, and the signal processing unit 25 processes the communication signal input from the signal detection unit 24 and inputs the processed communication signal into the load control unit 22.

Operation of the reception and load means 20 configured as such will be described.

A transformed power waveform having information '1011' as shown in FIG. 2(c) is input into the power supply unit 21 and the signal detection unit 24 by the transmission means 10 through the power line P.

The transformed power waveform flowing into the signal detection unit 24 is applied to a light emitting element 24a of a photocoupler PC.

Accordingly, the light emitting element 24a is turned off at a time point $t_A$ where the power waveform applied as shown in FIG. 2(c) arrives around the zero cross or power is cut off and is turned on at the other part of the power waveform.

A light receiving element 24b also turns on and turns off according to on and off of the light emitting element 24a.

For reference, since the light emitting element 24a is a device which is turned on only when a minimum rated voltage is supplied, it is turned off due to shortage of voltage around the zero cross point of the power waveform.

A pulse waveform as shown in FIG. 2(d) is output from the output terminal of the light receiving element 24b due to the on and off operation of the light receiving element 24b.

Output of the photocoupler 24 is processed by the signal processing unit 25 and input into the load control unit 22.

The load control unit 22 detects a value input from the signal processing unit 25, recognizes a pulse P1, P3 or P4 having a predetermined pulse width as signal '1', recognizes a pulse P1 which does not have a predetermined pulse width as signal '0', and determines that the input value is a signal having communication information of '1011'.

The load control unit 22 determines whether or not the detected communication information is a signal for controlling its own illumination lamp 23 (confirms an ID), and if it is determined that the communication information is a signal for controlling its own illumination lamp 23, the load control unit outputs a control signal corresponding to the communication signal, i.e., a control signal for turning on and off and/or dimming the light, so that the form of the power provided to the illumination lamp 230 by the power supply unit 21 may be changed.

The power line communication system invented by the inventor provides a lot of advantages such as communication accuracy and the like compared with a conventional power line modulation method.

However, such a power line communication system has problems described below.

First, in creating a communication signal using a power supply, the power cut off period $t_A$ as shown in FIG. 2 (c) should be long in order to further increase the recognition rate of the communication signal and securely and correctly transmit the communication signal.

However, it is understood that if the power cut off period $t_A$ is long, voltage Vs is increased at a time point where the switching device 13 of the transmission means 10 is turned on.

As described above, if the voltage Vs at the time point of turning on the switching device 13 is increased, a switching noise is generated.

Second, since the current always flowing through a load flows through the switching device 13 of the transmission means 10, flow of the current is increased, and, particularly, a lot of heat is generated according to the RDSon resistance value when the switching device 13 is turned on.

Due to such phenomena, there is a problem of cost and space since a semiconductor switching device having a large current capacity and a heat sink plate of a large capacity should be used.

In addition, there is a problem in that a lot of electrical energy is lost in the form of heat as the heat is generated.

Third, if a load has a high inrush current due to a large condenser component, there is a problem in that the semiconductor switching device 13 is destroyed since an extremely high inrush current flows when several loads are connected in parallel.

DISCLOSURE OF INVENTION

Technical Problem

Therefore, the present invention has been made in view of the above problems, and it is an object of the present invention to provide a closed-circuit power line communication system for a large capacity load, in which a first switch manufactured using a semiconductor switching device and a second switch manufactured using a mechanical relay switching device are configured in parallel in a transmission means, and an amount of heat generated by the semiconductor switching device is minimized by cutting off the second switch and performing a communication operation through the first switch when a communication is performed and short-circuiting the second switch to flow current through the second switch when a communication is not performed.

Another object of the present invention is to provide a closed-circuit power line communication system for a large capacity load, in which a pulse signal for a communication signal having a comparatively large pulse width is generated by cutting off the power around a zero cross of a power waveform in order to generate the communication signal, thereby greatly improving a recognition rate and accuracy of the communication signal.

Another object of the present invention is to provide a closed-circuit power line communication system for a large capacity load, in which burn-out of the first and second switches caused by inrush current when an initial power is supplied is prevented by further connecting a thermistor to a semiconductor switching device of a transmission means in series.

Another object of the present invention is to provide a closed-circuit power line communication system for a large capacity load, which can freely set an individual ID of a control target illumination lamp by adding an address setting unit in the reception and load means.

Technical Solution

To accomplish the above objects, according to one aspect of the present invention, there is provided a closed-circuit power line communication system for a large capacity load, the system including: a transmission means connected to one side of a power line in series to generate a communication signal and transmit the communication signal through the power line, and at least one or more reception and load means connected to both sides of the power line in parallel to receive and detect the communication signal transmitted through the power line and control a corresponding load, wherein the transmission means includes at least a switching control unit for generating and transferring a switching control signal to a first switch unit and a second switch unit to generate a power line communication signal, the first switch unit connected to one side of the power line in series to perform a switching operation by the switching control unit, and the second switch unit connected to the first switch unit in parallel to perform a switching operation by the switching control unit; and the switch control unit outputs a control signal for short-circuiting the second switch unit during a period when a communication is not performed, disconnecting the second switch unit when a power line communication is performed, and outputting a switching signal for a predetermined communication signal to the first switch unit in synchronization with a power waveform, in which the switching signal includes a switching signal for disconnecting the first switch for a short time period before or after or around before and after a zero cross of the power waveform flowing through the first switch unit.

In addition, the first switch unit according to the present invention is configured of a semiconductor switching device.

In addition, the second switch unit according to the present invention is configured of a relay switching device.

In addition, a thermistor is configured in the first switch unit according to the present invention to be connected to the semiconductor switching device in series.

In addition, the switch control unit according to the present invention disconnects the second switch unit and short-circuits the first switch unit for a predetermined time period when an initial power is supplied so that it is controlled to flow current through the semiconductor switching device and the thermistor of the first switch unit.

In addition, the reception and load unit according to the present invention includes: a power supply unit for receiving power input from the power line and supplying a driving power to an illumination lamp and a DC driving power to each circuit unit; a load control unit for receiving and analyzing the communication signal received from the signal processing unit and controlling turning on and off or dimming a corresponding illumination lamp according to the analysis; a signal detection unit for detecting a communication signal input through the power line; and a signal processing unit for processing the communication signal input from the signal detection unit and providing the communication signal to the load control unit.

In addition, the load control unit according to the present invention further includes an address setting unit capable of setting an ID of a control target illumination lamp.

Advantageous Effects

Since a first switch manufactured using a semiconductor switching device and a second switch manufactured using a mechanical relay switching device are configured in parallel in a transmission means, and an amount of heat generated by the semiconductor switching device is minimized by cutting off the second switch and performing a communication operation through the first switch when a communication is performed and short-circuiting the second switch to flow current through the second switch when a communication is not performed, the present invention as described above provides an advantage of saving cost and reducing space without the need of a large scale semiconductor switching device and a large capacity heat sink plate.

In addition, since a pulse signal for a communication signal having a comparatively large pulse width is generated by cutting off the power around a zero cross of a power waveform in order to generate the communication signal, the present invention provides an advantage of greatly improving a recognition rate and accuracy of the communication signal.

Furthermore, since a thermistor is further connected to a semiconductor switching device of a transmission means in series, the present invention fundamentally prevents burn-out of the first and second switches caused by inrush current when an initial power is supplied.

In addition, since an address setting unit is added in the reception and load means, the present invention provides an advantage of freely setting an individual ID of a control target illumination lamp.

BEST MODE FOR CARRYING OUT THE INVENTION

Hereafter, the preferred embodiments of the present invention will be described in detail with reference to the accompanying drawings.

Figure 3:
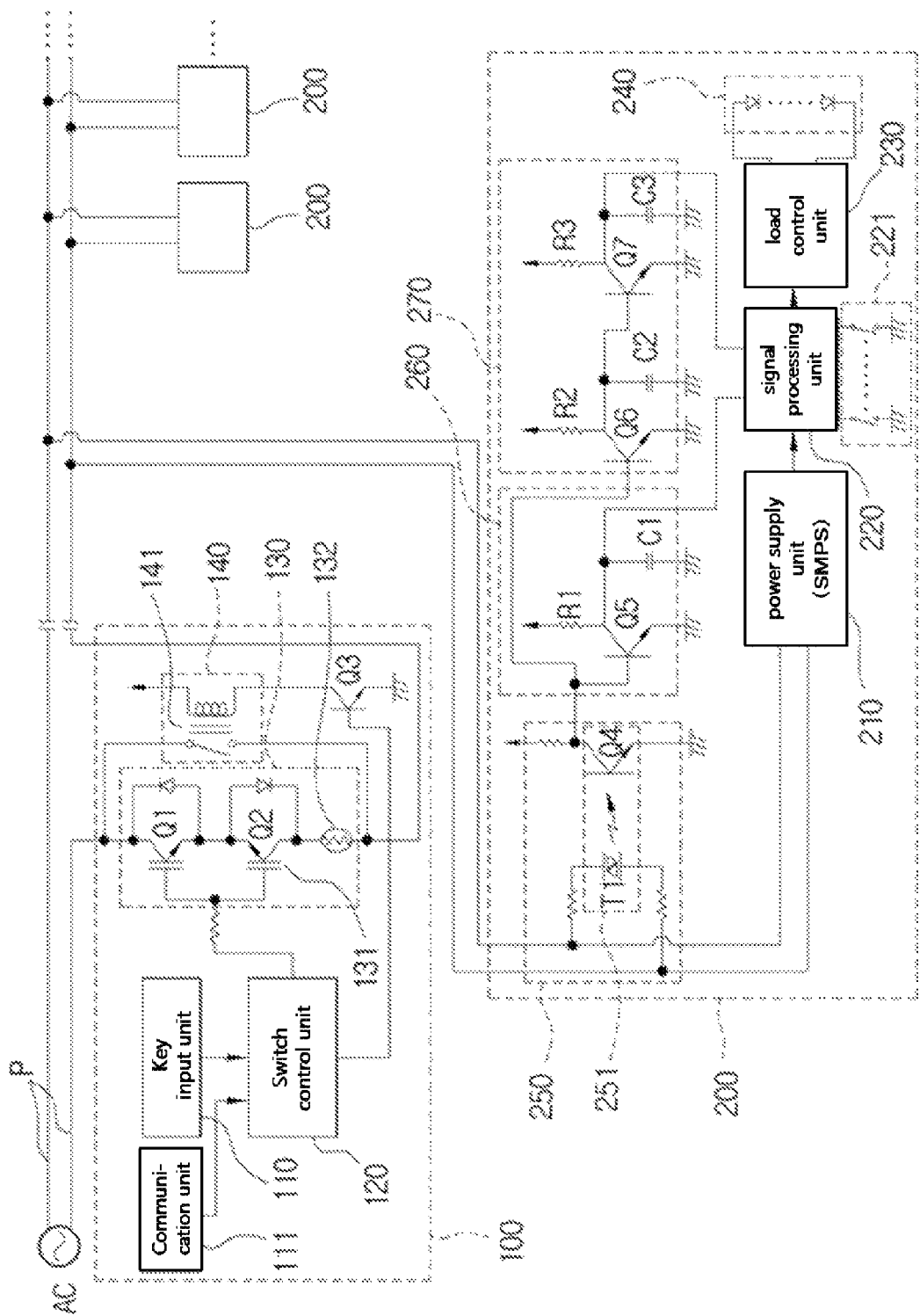
FIG. 3 is a view showing the configuration of a power line communication system for a large capacity load according to the present invention.

FIG. 3 is a view showing the configuration of a power line communication system for a large capacity load according to the present invention.

As shown in the figure, the power line communication system for a large capacity load according to the present invention includes a transmission means 100 connected to one side of the power line P in series to generate a communication signal and transmit the communication signal through the power line, and a plurality of reception and load means 200 connected to both sides of the power line P in parallel to receive the communication signal transmitted through the power line and control a corresponding load.

The transmission means 100 includes at least a switching control unit 120 for generating and transferring a switching control signal to a first switch unit 130 and a second switch unit 140 to generate a power line communication signal, the first switch unit 130 connected to one side of the power line in series to perform a switching operation by the switching control unit 120, and the second switch unit 140 connected to the first switch unit 130 in parallel to perform a switching operation by the switching control unit 120.

In addition, the first switch unit 130 is configured of a semiconductor switching device 131, and the semiconductor switching device 131 may be one of a Triac, a FET, an IGBT and a thyristor.

In addition, the second switch unit 140 is configured of a relay switching device 141, and the relay switching device 141 may be one of an electrical or mechanical relay and a semiconductor relay SSR.

However, the semiconductor switching device 131 and the relay switching device 141 are not limited to these, bu various modifications can be made.

In addition, a thermistor 132 is configured in the first switch unit 130 to be connected to the semiconductor switching device 131 in series.

In addition, the transmission means 100 may further include a key input unit 110 for inputting a key signal to generate and transfer a switching signal to the switch control unit 120, and a communication unit 111 for receiving a control signal from a control device such as a control system, an external program switch, a dimming switch or the like through a network or other communication means.

Operation of the transmission means 110 configured as such will be described.

First, when power line communication is not performed, the switch control unit 120 outputs a signal for turning on the relay switching device 141 to the second switch unit 140.

That is, the switch control unit 120 outputs a high signal to the second switch unit 140 to turn on the transistor Q3.

Then, current flows through a relay driving coil, and the contact point of the relay is short-circuited, and since the resistance component generated through the contact point of the relay is much smaller regardless whether the first switch unit 130 is in an on state or off state, current flows through the contact point of the relay. Accordingly, heat which is generated when the current flows through the first switch unit 130 is not generated.

The voltage waveform applied to the load in this state is as shown in FIG. 4(a).

When a communication is needed by a switch handling or an external command, the switch control unit 120 first outputs a high signal so that the first switch unit 130 may be turned on. If the first switch unit 130 is turned on, the second switch unit 140 is subsequently turned off so that the current may flow only through the semiconductor switching device 131 of the first switch unit 130.

Then, the switch control unit 120 outputs a switching signal for a predetermined communication signal to the first switch unit 130 in synchronization with the power waveform.

Figure 4:
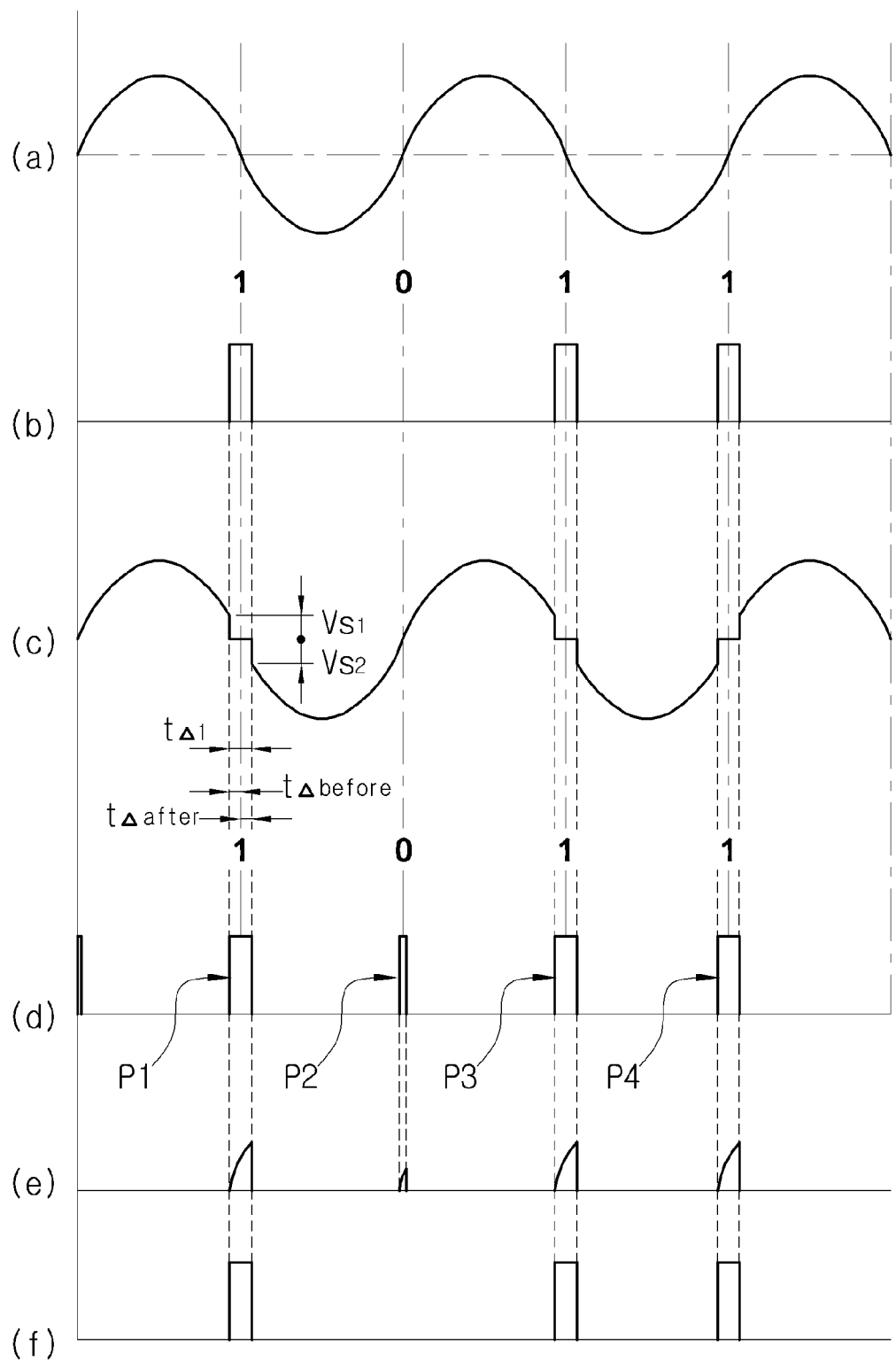
FIG. 4 is a view showing the output waveform of FIG. 3.

That is, the switch control unit 120 outputs a switching signal so that the semiconductor switching device 131 may be turned off for a short time period around a zero cross of the power waveform as shown in FIG. 4(*b*) in synchronization with the (AC) power waveform flowing through the first switch unit 130 as shown in FIG. 4(*a*).

The switching signal of a form as shown in FIG. 4(*b*) has a meaning of a communication signal (data) as described above.

Accordingly, it is understood that the power waveform output through the semiconductor switching device 131 is cut off for a short time period $t_{A1}$ around a zero cross as shown in FIG. 4(*c*).

Here, it is assumed that if voltage of the power waveform is in a 0V state for a predetermined time period $t_A1$ around a zero cross, this is defined as '1', and if there is no period in which voltage of the power waveform is cut off for a predetermined time period around a zero cross, this is defined as '0'.

Accordingly, FIG. 4(*b*) shows a switching signal having information '1011', and due to this switching signal, a power waveform transformed as shown in FIG. 4(*c*) by the switching signal is simultaneously applied to the plurality of reception and load means 200 through the power line.

Here, the communication information '1011' is an example and can be modified diversely, and contents of the communication information include information on an ID of a corresponding illumination lamp, as well as control information for turning on and off and dimming the illumination lamp, which is a corresponding load.

Figure 1:
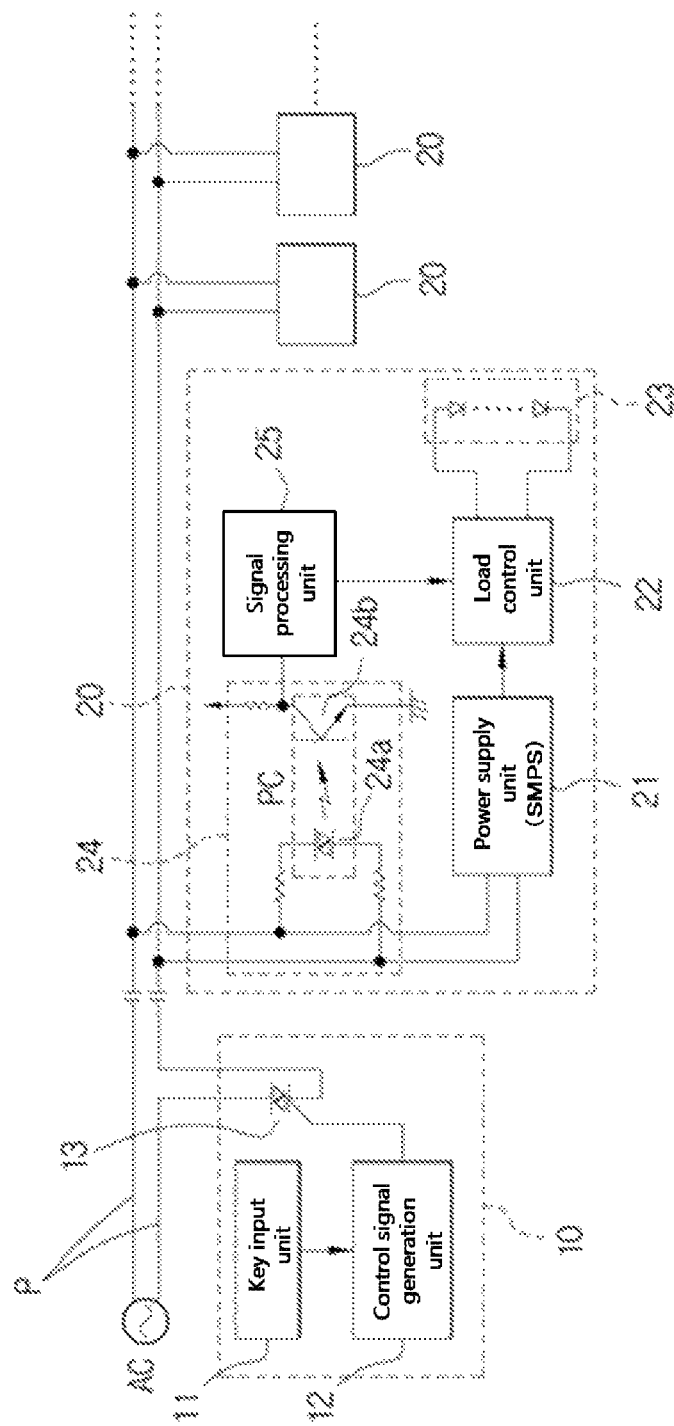
FIG. 1 is a view showing the configuration of an improved power line communication system of the prior art.
Figure 2:
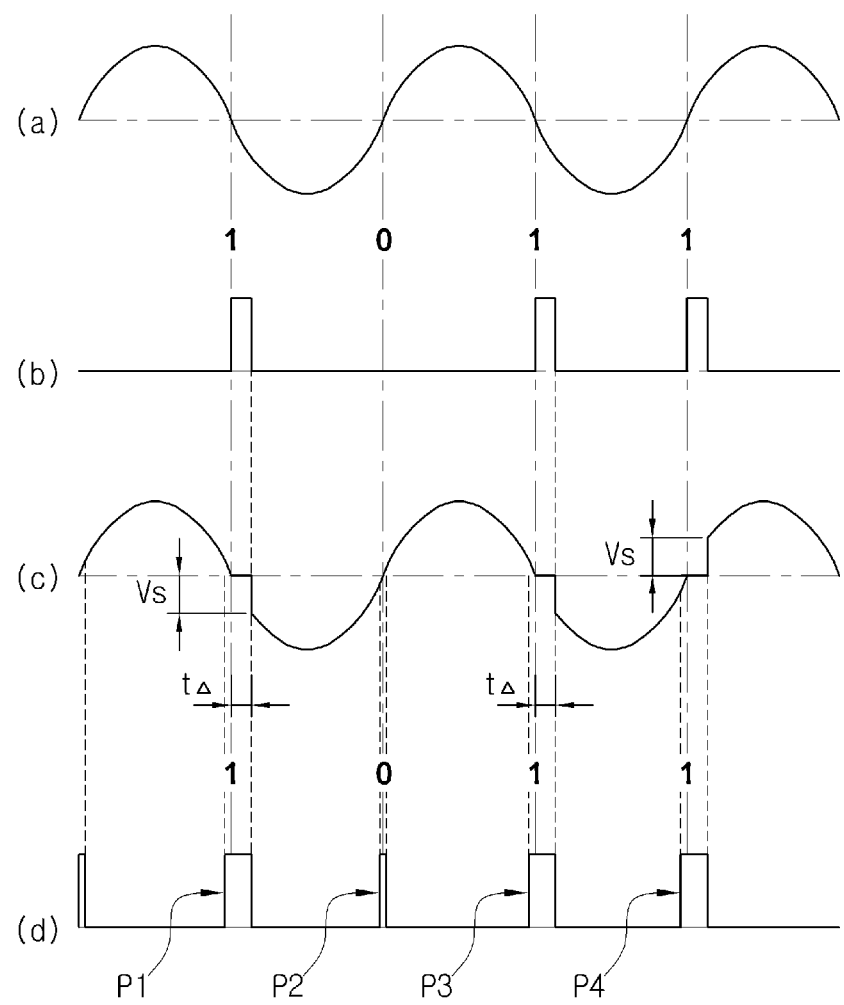
FIG. 2 is a view showing the output waveform of FIG. 1.

In addition, according to the present invention, in generating a transformed power waveform including communication information '1011' as show in FIG. 4(*c*), a time point of cutting off the power waveform is established within a short time period $t_{A1}$ around a zero cross. Therefore, since voltages $V_{S1}$ and $V_{S2}$ at the time point of turning on and off the semiconductor switching device 131 are low, a switching noise does not occur, and, at the same time, since the time period $t_{A1}$ is larger than the conventional pulse width time period $t_{A1}$ (FIG. 2(*c*)), the pulse width of the pulse signal for a communication signal is widened.

Accordingly, the present invention greatly improves the recognition rate and accuracy of a communication signal by generating a pulse signal for a communication signal having a comparatively large pulse width.

At this point, the time point of turning on or off the semiconductor switching device 131 may be varied depending on the characteristic of communication.

That is, if it is assumed that a time required to arrive at the zero cross after the switching device 131 is turned off before arriving at the zero cross is $t_{\Delta before}$ and a time from the zero cross until the switching device 131 is turned on is $t_{\Delta after}$, $t_{\Delta before}$ and $t_{\Delta after}$ can be randomly adjusted between zero and a predetermined time. As a result, $V_{S1}$ and $V_{S2}$ can be adjusted between 0V and a predetermined voltage. This adjustment can be selectively determined according to a device which is used.

In addition, if output of the power line communication signal described above is completed, the switch control unit 120 of the transmission means 100 outputs a signal for turning on the relay switching device 141 to the second switch unit 140 and outputs a signal for turning off the semiconductor switching device 131 to the first switch unit 130.

Accordingly, the sinusoidal power waveform as shown in FIG. 4(*a*) flows into the reception and load means 200 through the relay switching device 141.

In addition, in the present invention, there is provided a function for preventing damage applied to the parts by inrush current which is generated when an initial power is supplied to the system.

That is, when an initial power is supplied, the switch control unit 120 turns off the second switch unit 140 and turns on the first switch unit 130 so that current may flow through the semiconductor switching device 131 of the first switch unit 130.

Accordingly, since the inrush current which is generated when the power is supplied flows through the thermistor 132 connected to the semiconductor switching device 131 of the first switch unit 130 in series, burn-out of the semiconductor switching device 131 or the relay switching device 141 caused by the inrush current is prevented.

When a predetermined time is elapsed after the power is supplied, a normal operation of flowing current through the relay switching device 141 of the second switching unit 140 is performed by turning on the second switch unit 140 and turning off the first switch unit 130, and thus heat generated by the thermistor 132 and loss of energy caused by heat generation are fundamentally prevented during the normal operation.

In addition, the key input unit 110 and the communication unit 111 of the transmission means 100 input a control signal having information '1011', i.e., a key signal for generating a switching signal, into the switch control unit 120 or receive and input a control signal from another device through communication.

Meanwhile, the reception and load means 200 is a plurality of load units connected to the closed-circuit power line P in parallel and includes a power supply unit 210, a signal processing unit 220, a load control unit 230, an illumination lamp 240, a signal detection unit 250, a zero cross detection unit 260 and a bit signal detection unit 270.

The power supply unit 210 receives (AC) power input from the power line P and supplies a driving power to the illumination lamp 230 and a DC driving power to each circuit unit.

The signal processing unit 220 extracts a communication signal using the signal provided by the zero cross detection unit 260 and the bit signal detection unit 270, and processes and transmits the extracted communication signal to the load control unit 230.

In addition, an address setting unit 221 is further provided in the signal processing unit 220 so that an individual ID can be set freely for a control target illumination lamp.

Here, the address setting unit 221 may be diversely configured through dip switch setting, software setting, communication setting or the like.

The load control unit 230 analyzes the communication signal received from the signal processing unit 220 and controls a corresponding illumination lamp 240 in correspondence to the analysis.

The signal detection unit 250 is a circuit for detecting a communication signal input through the power line and includes a photocoupler 251 connected to both sides of the power line.

The zero cross detection unit 260 is configured of a transistor Q5, a resistor R1 and a capacitor C1 and shapes and provides a signal output through the signal detection unit 250 to the signal processing unit 220 so that the signal processing unit 220 may recognize the zero cross point of a waveform.

The bit signal detection unit 270 is configured of transistors Q6 and Q7, resistors R2 and R3 and capacitors C2 and C3 and shapes and provides a signal output through the signal detection unit 250 to the signal processing unit 220 so that the signal processing unit 220 may recognize correct bit information of the communication signal.

Operation of the reception and load unit 200 configured as such will be described.

If a transformed power waveform having information '1011' as shown in FIG. 4(c) is input by the transmission means 100 through the power line P, the transformed power waveform as shown in FIG. 4(c) is input into the power supply unit 210 and the signal detection unit 250.

The transformed power waveform flowing into the signal detection unit 250 is applied to a light emitting element T1 of a photocoupler 251.

Accordingly, the light emitting element T1 does not emit light at a time point $t_{A1}$ where the power waveform applied as shown in FIG. 4(c) arrives around the zero cross or power is cut off and emits light at the other part of the power waveform.

A light receiving element Q4 also turns on and turns off according to whether or not the light emitting element T1 emits light.

For reference, since the light emitting element T1 is a device which is turned on only when a minimum rated voltage is supplied, it is turned off due to shortage of voltage around the zero cross point of the power waveform.

A pulse waveform as shown in FIG. 4(d) is output from the output terminal of the light receiving element Q4 due to the on and off operation of the light receiving element Q4.

Output of the photocoupler 251 is input into the zero cross detection unit 260 and the bit signal processing unit 270.

The pulse waveform input into bit signal processing unit 270 as shown in FIG. 4(d) is output as shown in FIG. 4(e) by a time constant configured of capacitors C2 and C3.

In addition, pulse P2 of a short period is extinguished, and the pulse waveform as shown in FIG. 4(e) may be applied to the signal processing unit 220. Then, it is further easier to distinguish signal '1' from signal '0', and although the short period pulse appears without being extinguished, it is not difficult to distinguish '0' from '1' since the width of '1' is different from that of '0'.

As described above, the signal processing unit 220 detects a value input from the bit signal processing unit 260 in synchronization with a signal input from the zero cross detection unit 260, recognizes a pulse P1, P3 or P4 having a predetermined pulse width as signal '1', recognizes a pulse P2 having a short pulse width (or an extinguished pulse) as signal '0', creates a pulse signal having communication information of '1011' as shown in FIG. 4(f) by processing the signal, and outputs the pulse signal to the load control unit 230.

The load control unit 230 turns on or off and controls dimming of a light using a method of analyzing a signal input from the signal processing unit 220, determining whether or not the communication information is a signal for controlling its own illumination lamp 230 (confirms an ID), and controlling, if it is determined that the communication information is a signal for controlling its own illumination lamp 230, the current supplied from the power supply unit 210 to the illumination lamp 240 by outputting a control signal corresponding to the communication signal, i.e., a control signal for turning on and off and/or dimming the light.

Accordingly, when a communication is needed in a general closed-circuit power line, communication information provided by the transmission means 100 is detected by a corresponding reception and load means 200, and a corresponding illumination lamp 240 is automatically controlled in a form desired by a user.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:

1. A closed-circuit power line communication system for a large capacity load, the system comprising:
    a transmission means connected to one side of a power line in series to generate a communication signal and transmit the communication signal through the power line, and at least one or more reception and load means connected to both sides of the power line in parallel to receive and detect the communication signal transmitted through the power line and control a corresponding load, wherein
    the transmission means includes at least a switching control unit for generating and transferring a switching control signal to a first switch unit and a second switch unit to generate a power line communication signal, the first switch unit connected to one side of the power line in series to perform a switching operation by the switching control unit, and the second switch unit connected to the first switch unit in parallel to perform a switching operation by the switching control unit; and
    the switching control unit outputs a control signal for short-circuiting the second switch unit during a period when a communication is not performed, disconnecting the second switch unit when a power line communication is performed, and outputting a switching signal for a predetermined communication signal to the first switch unit in synchronization with a power waveform, in which the switching signal includes a switching signal for disconnecting the first switch for a short time period before or after or both before and after a zero cross of the power waveform flowing through the first switch unit.

2. The system according to claim 1, wherein the first switch unit is configured of a semiconductor switching device.

3. The system according to claim 1, wherein the second switch unit is configured of a relay switching device.

4. The system according to claim 1, wherein a thermistor is configured in the first switch unit to be connected to the semiconductor switching device in series.

5. The system according to claim 1, wherein:
    the first switch unit is configured of a semiconductor switching device;
    a thermistor is configured in the first switch unit to be connected to the semiconductor switching device in series, and
    the switch control unit disconnects the second switch unit and short-circuits the first switch unit for a predetermined time period when an initial power is supplied so that it is controlled to flow current through the semiconductor switching device and the thermistor of the first switch unit.

6. The system according to claim 1, wherein the transmission means further includes a key input unit for inputting a key signal to generate and transfer the switching signal to the switching control unit, and a communication unit for receiving a control signal from a control device comprising one of a control system, an external program switch, or a dimming switch through a network or other communication means.

7. The system according to claim 1, wherein the reception and load means includes:
- a power supply unit for receiving power input from the power line and supplying a driving power to an illumination lamp and a DC driving power to each circuit unit;
- a signal processing unit for extracting a communication signal using the signal provided by a zero cross detection unit and a bit signal detection unit, and processing and transmitting the extracted signal to a load control unit;
- a load control unit for analyzing the communication signal received from the signal processing unit and controlling a corresponding illumination lamp in correspondence to the analysis;
- a signal detection unit for detecting a communication signal input through the power line;
- the zero cross detection unit for shaping and providing a signal output through the signal detection unit to the signal processing unit so that the signal processing unit may recognize a zero cross point of a waveform; and
- the bit signal detection unit for shaping and providing a signal output through the signal detection unit to the signal processing unit so that the signal processing unit may recognize correct bit information of the communication signal.

8. The system according to claim 7, wherein the signal processing unit further includes an address setting unit capable of setting an ID of a control target load through a dip switch, software or a communication protocol.

* * * * *